(12) United States Patent
Lai et al.

(10) Patent No.: US 6,734,129 B2
(45) Date of Patent: May 11, 2004

(54) ZEOLITE MEMBRANE COMPOSITES (LAW730)

(75) Inventors: Wenyih F. Lai, Bridgewater, NJ (US); Edward William Corcoran, Jr., Easton, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/302,278

(22) Filed: Nov. 22, 2002

(65) Prior Publication Data

US 2003/0104925 A1 Jun. 5, 2003

Related U.S. Application Data

(63) Continuation of application No. 09/109,602, filed on Jul. 2, 1998, now abandoned.
(51) Int. Cl.[7] .................................................. B01J 29/06
(52) U.S. Cl. ................................ 502/4; 502/60; 502/64
(58) Field of Search ................................ 502/4, 60, 64

(56) References Cited

U.S. PATENT DOCUMENTS

| | | | | |
|---|---|---|---|---|
| 5,716,527 A | * | 2/1998 | Deckman et al. | 210/651 |
| 5,871,650 A | * | 2/1999 | Lai et al. | 210/653 |
| 5,895,769 A | * | 4/1999 | Lai | 502/4 |
| 6,037,292 A | * | 3/2000 | Lai et al. | 502/60 |

FOREIGN PATENT DOCUMENTS

| | | | |
|---|---|---|---|
| JP | 10-036114 | * | 2/1998 |
| WO | WO 96/01683 | * | 1/1996 |
| WO | WO 97/25129 | * | 7/1997 |

\* cited by examiner

*Primary Examiner*—Kiley Stoner
*Assistant Examiner*—Christina Ildebrando
(74) *Attorney, Agent, or Firm*—Ronald D. Hantman

(57) ABSTRACT

The invention is related to a zeolite membrane composite composition comprising a first zeolite or zeolite-like layer, a second independently selected catalytic, permselective, or combined catalytic-permselective layer, and a porous support, the porous support having a first surface in contact with the first zeolite layer and a second surface in contact with the second layer. In another embodiment, the invention is directed toward a zeolite membrane composite composition comprising a supported zeolite or zeolite-like layer, the support having a catalytic functionality contained thereon.

10 Claims, 7 Drawing Sheets

Figure 1:
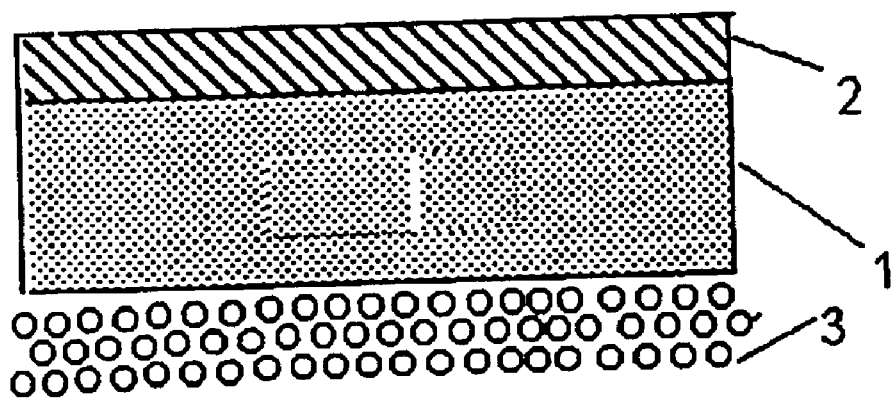

ZEOLITE MEMBRANE COMPOSITES (LAW730)

This is a Continuation of the application Ser. No. 09/109,602, filed Jul. 2, 1998, now abandoned.

FIELD OF THE INVENTION

The present invention is directed towards compositions having a first zeolite layer, a second layer that may be permselective, catalytic, or both, and a substrate or support situated therebetween.

BACKGROUND OF THE INVENTION

Molecular sieve membranes such as zeolite membranes have been proposed for uses such as molecular separations, reactions, and combined separations and reactions. Such membranes, sometimes referred to as molecular sieve membrane composites or zeolite membrane composites, comprise a zeolite layer, or other inorganic layer capable of molecular separations, on porous or solid substrates. The membranes may also include optional growth enhancing layers, seed layers, and reparation layers. Layers in contact with or penetrating into the support may be used to reduce support invasion by the zeolite layer. Additionally, the zeolite layer may have a catalytic functionality present in the layer itself, in some cases inherently, or in the form of a proximately-located catalytically active material.

However, some separation, reaction, or combined separation/reaction processes cannot be performed with zeolite membranes known in the art. Some examples of such processes include cases where the catalytic functionality is in the form of catalyst distributed, sometimes with a binder, on or in to one or more layers of the membrane. Unfortunately, such membranes would be subject to catalyst attrition. Binder contamination is also a problem, especially in cases where the binder is itself catalytic.

Zeolite compositions capable of combined separation and reaction are known in the art. One example of such a composition uses conventional catalyst particles on or near the separation layer so that specific products and reactants can be selectively added or removed from the reaction zone. In other examples of such compositions, the catalytic functionality, which may be in the form of catalyst particles, is located within the zeolite layer.

It is desirable to apply compositions combining reaction and separation functionalities to processes involving staged separations. In staged separations, one or more reactants are separated from a reactant source by a zeolite or zeolite-like layer. One or more additional layers may be used to further separate the reactants, reactants and products, or products formed in or between the layers. Compositions of two or more layers, one of which is a zeolite layer, in combination with catalytic functionality and capable of staged separation are not known in the art. Obstacles to forming such compositions include materials-based incompatibilities.

Therefore, there remains a need for zeolite membrane composite compositions having a first zeolite layer, a second layer that may be permselective, catalytic, or both, and a substrate situated therebetween, the composite being capable of separations, reactions, and combined reaction and separation. There is also a need for zeolite membrane composite compositions having a permselective zeolite layer in contact with a support, the support having a catalytic functionality contained thereon.

SUMMARY OF THE INVENTION

In one embodiment, the invention is a zeolite membrane composite composition comprising:

a substrate in contact with a mesoporous, crystalline or polycrystalline intermediate layer of a catalytic functionality ranging in size from about 0.1 to about 100 micrometers and nanocrystalline or colloidal-sized zeolite, the intermediate layer being in contact with a dense layer of columnar zeolite crystals having pore openings wherein 99% of the columnar zeolite crystals have at least one point between adjacent crystals that is less than or equal to 20 Å.

BRIEF DESCRIPTION OF THE DRAWINGS

FIG. 1 shows a zeolite layer (2) on a porous support (1) having catalyst particles (3) thereon.

FIG. 2 shows a supported zeolite layer (2) having a region of catalytic functionality (3) contained therein.

FIG. 3 shows a porous support (1) situated between a zeolite layer (2) and a catalyst layer (3).

FIG. 4 shows a supported zeolite layer wherein a catalytic functionality (3) is contained in the support (1).

FIG. 5 shows a zeolite layer (2) in contact with a seed layer 94) containing a catalytic functionality (3) which in turn is in contact with a porous support (1).

FIG. 6 is an electron micrograph the composite illustrated schematically in FIG. 5.

FIG. 7 schematically represents a composition of a zeolite layer on a porous support that is in contact with a second zeolite layer. The support has an internal catalytic functionality. The figure also schematically illustrates the use of such a composition in a reaction involving both reaction and separation.

DETAILED DESCRIPTION OF THE INVENTION

The invention is based on the discovery that monolithic compositions can be formed having a first zeolite layer in contact with a support that is in contact with a second layer. The invention is also based upon the discovery that monolithic compositions can be formed having a zeolite or zeolite-like membrane in contact with a support, the support having a catalytic functionality contained thereon.

In one embodiment, the invention is a monolithic zeolite membrane composite comprising at least two independently selected zeolite layers having a support situated therebetween. The zeolite layers may be permselective, catalytic, or both. Process applications in which the invention can be used include separations of molecular species, catalytic reactions and reactions which combine reaction and separation. The composition may contain a permeable intermediate layer situated between the support and one of the zeolite layers. Intermediate layers may also be situated between the zeolite layers. The invention is compatible with reparation and selectivity-enhancing coatings on the zeolite layers.

Advantageously, the zeolite layers included in the compositions of the invention are formed from crystals that are contiguous, i.e., substantially every crystal is in contact with one or more of its neighbors. Such contact may be such that neighboring crystals are intergrown, provided they retain their identity as individual crystals. In a preferred embodiment, the crystals in the layer are closely packed.

It is preferred that the layer's crystals are intergrown in the zeolite layer so that nonselective permeation paths through the layer are blocked by the narrowest point of approach between crystals. Non-selective permeation pathways are taken to be permeation pathways which exist at room temperature that do not pass through the zeolite crystals. This blockage of nonselective permeation pathways can exist at room temperature after a template which occludes the pore structure is removed from the zeolite crystals. Templates used to aid in the crystallization of zeolites may be removed by a calcination step; intergrown zeolite crystals (within a layer) should exhibit a blockage of nonselective permeation pathways after the template is removed. A preferred dense zeolite layer is formed such that there exists at least one point on a crystal that is less than 20 Å from a point on an adjacent crystal. Between these points can be inorganic oxide material that restricts nonselective permeation of molecules through the layer. The spacing between zeolite crystals in this dense intergrown zeolite layer can be established by TEM or with dye permeation tests.

The absence of nonselective permeation paths can be detected by methods known in the art and set forth in U.S. Pat. Nos. 5,763,347 and 5,716,527, incorporated by reference herein.

The zeolite crystals forming the zeolite or zeolite-like layers of the invention are as set forth in the referenced patents, as are the layers' structure, spatial and crystallographic orientation, and defect and void concentration. Such properties may be individually selected in each layer of the invention.

Monolithic compositions of the present invention include a support material in contact with one or more of the zeolite layers. The support may be porous or non-porous. Supports useful in the invention and their properties are set forth in the referenced patents. Mesoporous and microporous intermediate layers may be present in the invention between a zeolite layer and a support, between zeolite layers, and between zeolite and non-zeolite layers. Such intermediate layers are known in the art, and are set forth in the referenced patents. GEL and seed layers are both useful in the invention.

The thickness of the zeolite layers is within the range 0.1 to 150 $\mu$m, preferably from 0.5 to 20 $\mu$m. The thickness of each layer is independently selected.

The zeolite or zeolite-like layers of the invention may be formed from a slurry containing zeolite according to methods known in the art. They may also be hydrothermally formed by contacting the support GEL, or seed layer with a zeolite synthesis mixture, and heating for a time and at the temperature sufficient to effect crystallization. Contacting as used herein includes total and partial immersion. Heating times may be, for example, in the range of from 1 hour to 10 days, preferably from 24 hours to 4 days. Temperatures may be, for example, from 50 to 300° C., preferably from 90 to 200° C. Contacting of the substrate with GEL or seed layer must be carried out such that there is no settling of crystals formed in the synthesis mixture during hydrothermal treatment onto the GEL or seed layer. When a true zeolite material is formed, the synthesis mixture contains a source of silica; optimally a structure directing agent, and a source of any other component desired in the resulting zeolite. It may also contain nanocrystalline zeolites or seed crystals. Synthesis mixtures from which zeolite crystals are grown are well known in the art (see e.g., *Handbook of Molecular Sieves*, Rosemarie Szostak, Van Nostrand Reinhold, N.Y. 1992). A preferred route for MFI zeolites, e.g., is from a Low Alkaline synthesis mixture having a pH of about 6 to about 13 preferably about 8 to about 13, and from which MFI zeolite crystals can be grown. Such mixtures are readily prepared by those skilled in the art. For example, suitable mixtures include $Na_2O$, TPABr, tetrapropylammoniumbromide, $SiO_2$ and water. The compositions are grown by contacting the GEL coated substrate in the low alkaline synthesis mixture. The synthesis mixture is then heated to about 50 to about 300° C., preferably about 180° C., for a period of about 30 minutes to about 300 hours, preferably for about 30 minutes. After crystallization, the supported layer may be washed to remove un-reacted synthesis material, dried (typically at about 120° C. for about 2 hours), and calcined (typically in air at 500° C. for about 6 hours) according to methods known in the art.

As set forth in the referenced patents, zeolite layer synthesis solutions contain colloidal-sized silica precursors ranging in size from below about 0.1 micrometer. When support pore sizes range larger than the silica precursor size, then support invasion by the synthesis solution may occur, and the hydrothermally formed zeolite layer may partially or entirely fill the substrate's pores. The amount of such support invasion may be at least partially controlled by the presence of a diffusion barrier between the support and the synthesis solution. The diffusion barrier may be organic or inorganic, and may be in the form of a layer on the substrate.

A preferred synthesis technique used with this invention is the growth of zeolite crystals on the face a support or intermediate layer which is oriented from 90 to 270 degrees in a synthesis mixture, as set forth in the referenced patents.

The compositions of the invention are selective molecular separators. Such compositions, as set forth herein are useful for all separations, reactions, and combined reactions and separations set forth herein and in the referenced patents.

Depending on the nature of the desired process, i.e. whether it involves reactions, separations, or a combination of separations and reactions, the composition may be in the form of a composite. The composites shown in FIGS. 1 through 4 are illustrative of the invention, and are not meant to be limiting. Combinations of two or more of the composites are within the scope of the invention. The illustrated composites have zeolite layers in contact with supports, but compositions having intermediate layers situated therebetween as set forth in the referenced patents and in PCT publication WO 96/01867, incorporated by reference herein, are also within the scope of the invention. The illustrated composites are shown for simplicity in planar form, i.e. as layers having a small thickness compared to surface area. Concentric tubular composites are also within the scope of the invention, and such composites may for example be in monolithic or honey-comb form. A zeolite layer, non-zeolite layer, or substrate may for example be the innermost, inner, or outermost concentric layer of the tube or monolith.

In the composition illustrated in FIG. 1, a permselective zeolite layer is in contact with one side of a porous support. The other side of the support is in contact with a catalytic functionality such as loosely bonded catalyst particles. The embodiment of FIG. 1 is especially useful in processes requiring periodic catalyst replacement and in processes requiring post-synthesis zeolite layer reparation. Catalyst-membrane abrasion is also avoided in this embodiment.

Figure 2:
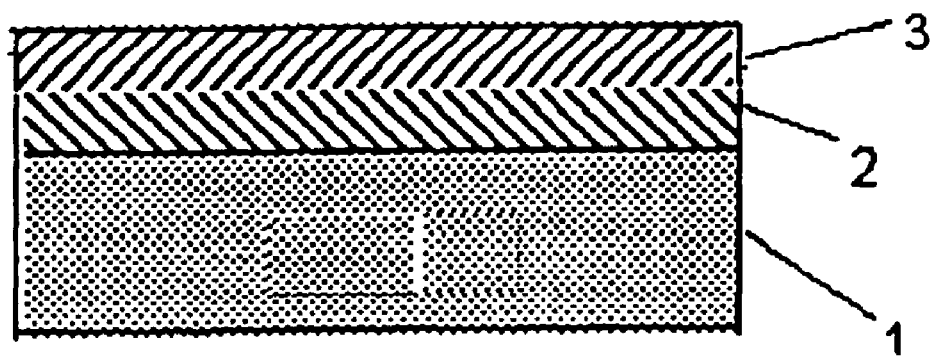

In a related embodiment, the catalytic functionality is incorporated into a region of the separation layer, as set forth in FIG. 2. Advantageously, the composition may be formed in a single growth reaction with the addition of the catalytic functionality or its precursor occurring near the end of the synthesis in order to incorporate the catalytic functionality into the outermost zone of the separation layer. This growth may take the form of secondary growth (i.e. multiple in situ hydrothermal syntheses, with or without seeding), post-synthetic treatment (e.g. treatment with an Al-O source to incorporate acidic Al—O—H into the system), or introduction of an alumina source into the primary reaction mixture after a specific period of time resulting in a zeolite layer with a varying Si/Al composition in different zones. This embodiment is advantageous in processes where close proximity is desirable between the catalytic and separation functionalities and where it is desirable for the catalytic layer to reparate the separation layer.

Figure 3:
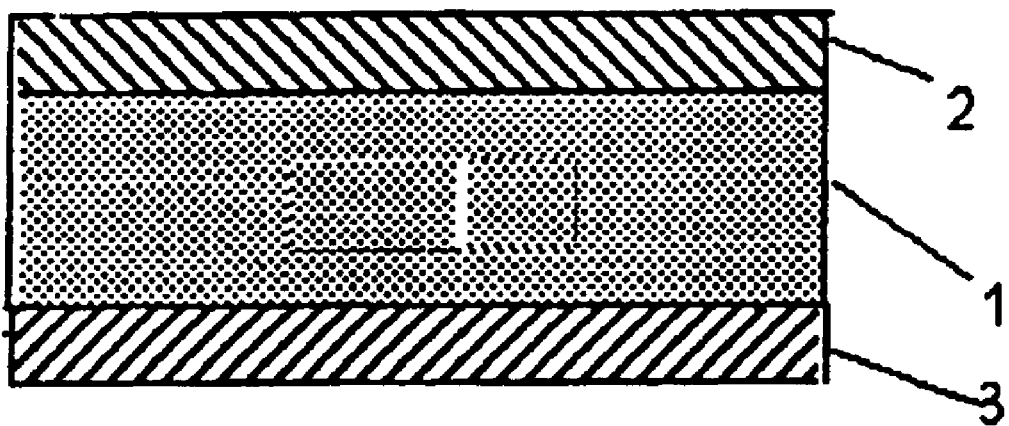
Figure 4:
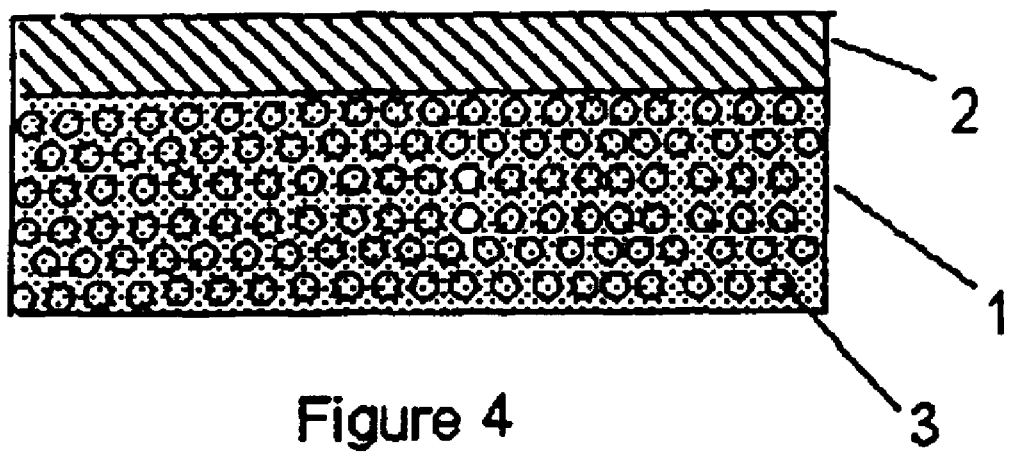

In another embodiment illustrated in FIG. 3, a porous support is situated between a catalyst layer and a zeolite separation layer. The layers may be formed according to the methods set forth herein; the catalyst layers may, alternatively, be formed by slip-coating or casting methods known in the art.

Figure 5:
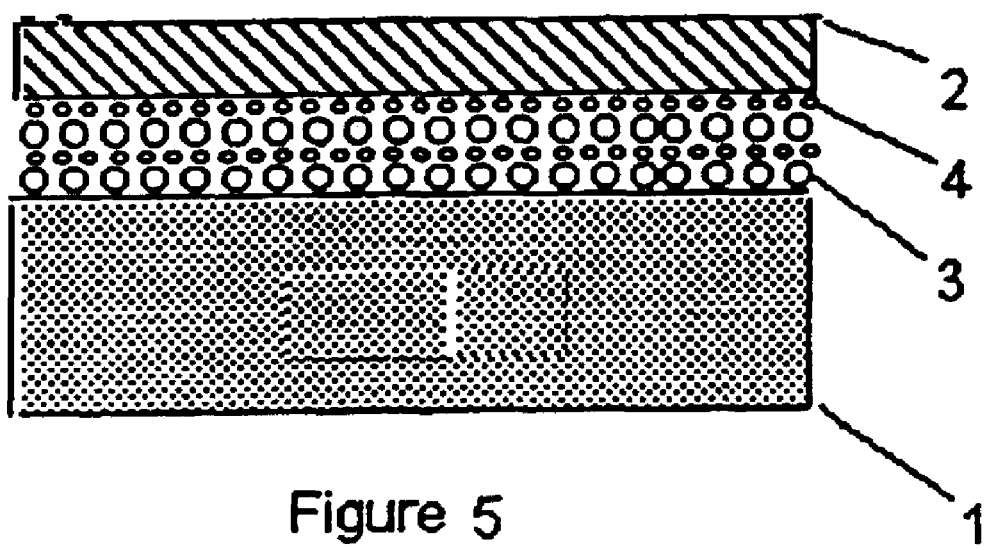
Figure 6:
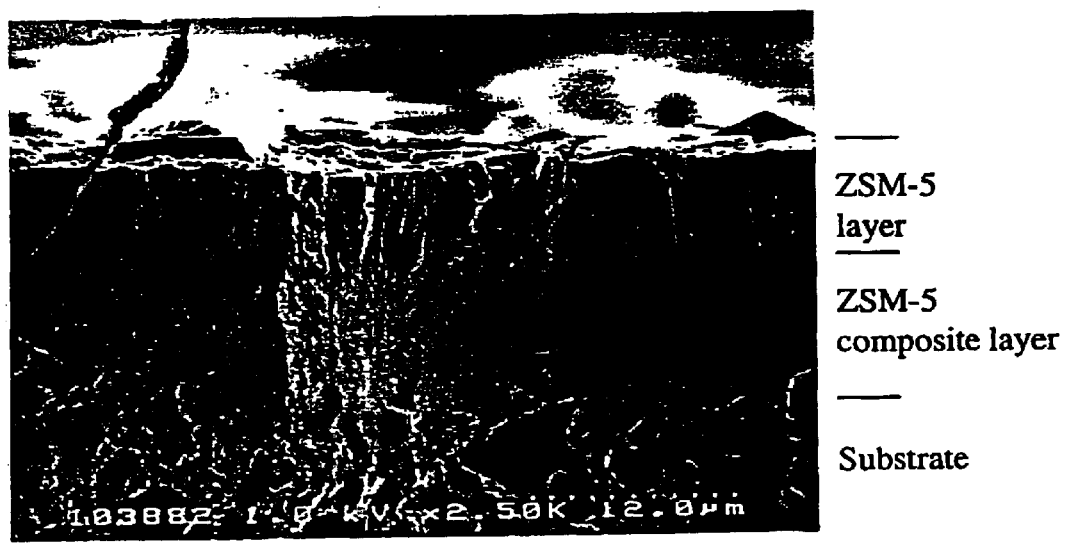

A catalytic functionality may also be present in the support (FIG. 4) or in a seed layer situated between the support and the separation layer (FIG. 5). Advantages related to including the catalytic functionality in the support material include ease of fabrication and relatively low mass transfer resistance. When the catalytic functionality is located in the intermediate layer, the layer may be in the form of catalytically active seeds or a composite of seeds and catalyst such as a layer of seeds deposited on a layer of catalyst. Such seed layers and their formation by processes such as LAI-ISC are set forth in the referenced patents. Sub-micron-sized and larger catalyst particles that may be zeolites maybe incorporated into the nucleation layer with or without a binder. Surprisingly, the presence of such particles does not diminish the seed layer's effectiveness in nucleating an intergrown zeolite membrane. An electron micrograph shown in FIG. 6 shows a porous substrate having a seed layer containing ZSM-5 particles of about 1 micron diameter, with an intergrown ZSM-5 layer thereon. The catalyst particles may range in size from about 0.1 to about 100 micrometers, preferably from about 1 to about 100 micrometers, and more preferably from about 10 to about 100 micrometers.

Zeolite compositions of the invention may be utilized to conduct a wide variety of separations based on their molecular sieving capabilities. Their performance is largely determined by their framework geometry (pore structure) and framework composition. Additionally, their separations behavior may be influenced by extra-framework, charge-balancing cations, which may reduce access to, or mobility through their internal pore network. Thus, diffusivity of a molecular species through a zeolite pore system (for components which are not restricted from entering the pore because of a prohibitively large kinetic diameter) may be restricted by cations residing within the channel and influenced by interactions with the atoms encountered at the channel surface.

It may be desirable to separate a mixture of components utilizing these two phenomena (size exclusion (pore restriction) and surface interaction) in various combinations.

Processes involving acid- and/or metal-catalyzed reactions are within the scope of the invention. The properties exhibited by a specific material depend largely on (i) the framework structure/geometry of the zeolite; (ii) both the framework and non-framework (i.e. detrital) atoms of the material; (iii) inherent or exchanged cations; (iv) metals impregnated into the material (typically post-synthesis); (v) any other post-synthetic treatment such as selectivation, coking, or silanation.

Figure 7:
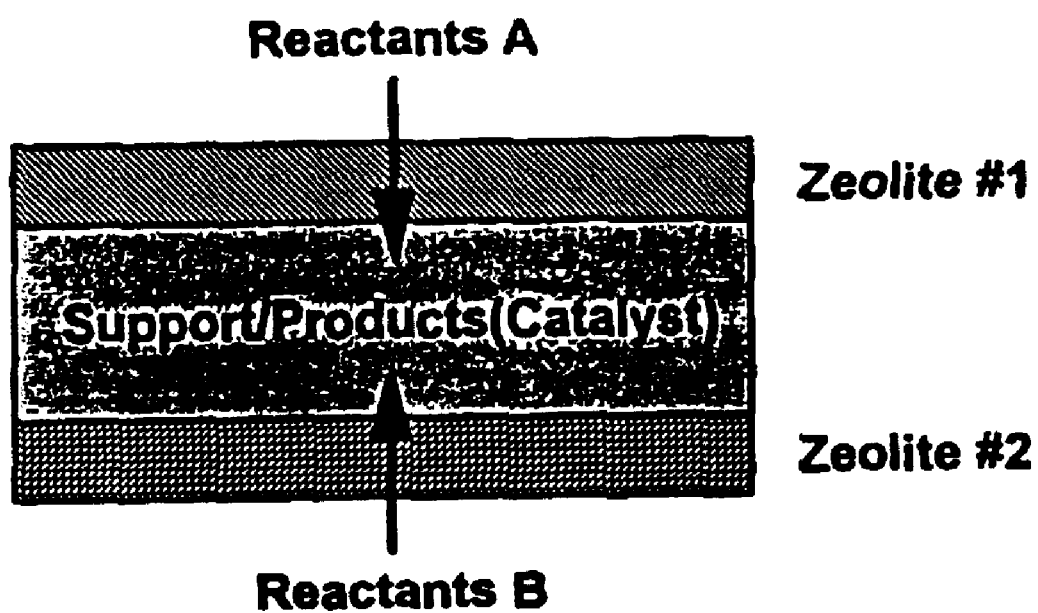

In one such process shown in FIG. 7, two reactant mixtures are separated and run through two different zeolite catalyst layers, with the option for reaction at a third catalytic site within the layer support. Benefits accruing from the use of the invention's compositions in such processes include selectivity enhancement of a catalytic reaction, strict control of reaction stoichiometry, reaction rate enhancement, limiting which reactants 'see' the catalyst, and protection of a catalyst from deactivation by contaminants in the reaction mixture. Multiple layers can also be used on either side of a support to separate components from two different reaction mixtures so that a limited number reactants react at catalytic sites within a support.

A particularly advantageous use of the compositions of the invention involves producing species in concentrations above equilibrium in equilibrium-limited catalytic reactions, especially in equilibrium limited isomerization reactions of xylenes isomers. The use of the compositions of the present invention in such a process is set forth in more detail below.

Maintaining a constant feed of equilibrium xylene isomers is critical to the success of a zeolite membrane separation system for enhancing production of para-xylene because the feed is quickly depleted of para-xylene by the membrane. In the practice of this invention, this is accomplished by combining an isomerization catalyst with the permselective membrane transport system.

Such an isomerization catalyst may be one of the known aromatic isomerization catalysts, including acidic materials such as ZSM-5 and precious metal catalysts. The catalytic functionality should be properly positioned within the reactor membrane system relative to the separation layer. It is advantageous to keep the catalyst in very close proximity to the separation functionality, as in FIGS. 5 and 6, of the membrane system so that a constant source of para-xylene is available to the membrane (i.e. the catalyst quickly re-equilibrates the remaining xylene isomers to maintain a source of para-xylene). Separating the two components by a significant distance may require back diffusion by the para-depleted feed to re-establish equilibrium, thus lowering the overall efficiency of the system.

Several other criteria, in addition to catalyst placement and selection, have a bearing on combining the catalytic and separation functionalities. The effective reactivity of the catalytic component should be sufficient to constantly maintain isomer equilibrium; i.e. catalytic reactivity must be greater than the rate of para-xylene removal. The reactivity is controlled by several factors including (using an acid catalyst such as ZSM-5 as an example): (i) process conditions; (ii) framework silica/alumina ratio, which generally determines the acidity, and therefore, the activity of the catalyst; and (iii) the amount of catalyst, or more specifically, catalyst surface area, available for reaction.

The framework composition of the acidic zeolite is largely determined by the hydrothermal reaction conditions established for the crystallization of the material as set forth herein and in the referenced patents. In the absence of any alumina source, the MFI structure resulting from a tetrapropylammonium cation-directed synthesis is completely devoid of any framework aluminum (silicalite-1) and, consequently, any catalytic activity. This structure is ideal, however, for separation of para-xylene from its isomers because it is incapable of converting para-xylene back into an equilibrium mixture (its pore size is also suitable for this molecular separation). However, the presence of alumina and, depending on hydrothermal reaction conditions, aluminum incorporation into the framework, provides a source of Brönsted acidity necessary for catalytic isomerization.

Catalyst volume, surface area, regeneration, and replacement considerations also have a bearing on the use of the compositions of the invention in para-xylene production. For loose catalyst particles, a volume of sufficient size to contain the amount of catalyst required (to maintain xylenes equilibrium for the membrane) is necessary. Regarding catalyst regeneration and replacement, important criteria include the choice of feed/sweep flow (counter- vs. co-current), hydrogen requirements, heat effects, and the need for cross-cut channels to improve overall system flow.

What is claimed is:

1. A zeolite membrane composite composition comprising:
   two dense layers of columnar zeolite crystals having pore openings wherein 99% of the columnar zeolite crystals have at least one point between adjacent crystals that is less than or equal to 20 Å and a substrate there between.

2. The composition of claim 1 wherein the zeolites of the zeolite layers are independently selected contiguous, intergrown, polycrystalline zeolites ranging in thickness from about 0.1 to about 100 micrometers, and wherein the substrate is selected from the group consisting of stainless steel and alumina substrates.

3. The composition of claim 2 wherein the zeolites of the zeolite layers are selected from the group consisting of zeolite X, zeolite Y, ZSM-5 zeolite, silicalite, and mixtures thereof.

4. The composition of claim 3 further comprising a selectivity-enhancing coating capable of obstructing about 50% of the dense layer's pore openings and increasing the composition's mass transfer resistance by a factor ranging from about 1 to about 5 and selected from the group of permeable coatings, impermeable coating, and mixtures thereof.

5. The composition of claim 4 wherein the intermediate layer has interstices of about 20 to about 2000 Å.

6. The zeolite membrane composite of claim 1 further comprising a first mesoporous, crystalline or polyctystalline intermediate layer of a catalytic functionality whose catalyst particles range in size from about 0.1 to about 100 micrometers and nanocryatalline or colloidal-sized zeolite, said intermediate layer between said substrate and one of said zeolite layers.

7. The zeolite membrane composite of claim 6 further comprising a second mesoporous, crystalline or polycrystalline intermediate layer of a catalytic functionality whose catalyst particles range in size from about 0.1 to about 100 micrometers and nanocrystalline or colloidal-sized zeolite, said second intermediate layer in contact with said substrate in the side opposite said first intermediate layer.

8. The zeolite membrane of claim 6 wherein said substrate has catalytic functionality.

9. The zeolite membrane of claim 7 wherein said substrate has catalytic functionality.

10. The zeolite membrane of claim 1 further comprising dense layers of columnar zeolite crystals wherein each of the dense layers is separated by a substrate.

* * * * *